(12) United States Patent
Cai

(10) Patent No.: US 11,244,228 B2
(45) Date of Patent: Feb. 8, 2022

(54) METHOD AND DEVICE FOR RECOMMENDING VIDEO, AND COMPUTER READABLE STORAGE MEDIUM

(71) Applicant: Beijing Dajia Internet Information Technology Co., Ltd., Beijing (CN)

(72) Inventor: Jinlong Cai, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/257,150

(22) PCT Filed: Sep. 12, 2019

(86) PCT No.: PCT/CN2019/105785
§ 371 (c)(1),
(2) Date: Dec. 30, 2020

(87) PCT Pub. No.: WO2020/088126
PCT Pub. Date: May 7, 2020

(65) Prior Publication Data
US 2021/0248477 A1      Aug. 12, 2021

(30) Foreign Application Priority Data
Oct. 31, 2018   (CN) .......................... 201811291215.8

(51) Int. Cl.
*G06K 9/62*     (2006.01)
*G06N 3/08*     (2006.01)
(Continued)

(52) U.S. Cl.
CPC ........... *G06N 3/084* (2013.01); *G06F 16/435* (2019.01); *G06F 16/783* (2019.01);
(Continued)

(58) Field of Classification Search
CPC .......... G06K 9/00496; G06K 9/00711; G06K 9/00718; G06K 9/00744; G06K 9/00973;
(Continued)

(56) References Cited

U.S. PATENT DOCUMENTS 6,773,266 B1   8/2004  Dornbush et al.
8,032,469 B2   10/2011 Atallah
(Continued)

FOREIGN PATENT DOCUMENTS

CN   107515909 A   12/2017
CN   108228824 A   6/2018
(Continued)

OTHER PUBLICATIONS

Xusong Chen, Dong Liu, Zheng-Jun Zha, Wengang Zhou, Zhiwei Xiong, Yan Li, "Temporal Hierarchical Attention at Category- and Item-Level for Micro-Video Click-Through Prediction", Proceedings of the 26th ACM international conference on Multimedia (MM '18), Oct. 15, 2018, pp. 1146-1153 (Year: 2018).*
(Continued)

*Primary Examiner* — Eric Rush
(74) *Attorney, Agent, or Firm* — Meunier Carlin & Curfman LLC

(57) ABSTRACT

The application relates to a video recommendation method and device, and a computer readable storage medium. The video recommendation method comprises: obtaining a user feature of a sample user and a video feature of a sample video; learning a click rate, a like rate, and a follow rate on the basis of a full-connection neural network algorithm to obtain trained user feature and video feature; performing, according to the trained user feature and video feature, combined learning on the click rate, the like rate, and the follow rate on a user side neural network and a video side neural network; and obtaining a video recommendation list
(Continued)

according to a network parameter of a neural network algorithm obtained by means of combined learning. According to the video recommendation method, by adding a full-connection neural network algorithm training phase, the trained user feature and video feature are obtained.

18 Claims, 7 Drawing Sheets

(51) Int. Cl.

| | |
|---|---|
| *G06K 9/00* | (2006.01) |
| *G06F 16/435* | (2019.01) |
| *G06Q 30/02* | (2012.01) |
| *G06N 3/02* | (2006.01) |
| *H04N 21/442* | (2011.01) |
| *H04N 21/25* | (2011.01) |
| *H04N 21/466* | (2011.01) |
| *G06F 16/783* | (2019.01) |
| *G06F 16/9535* | (2019.01) |
| *G06F 16/78* | (2019.01) |

(52) U.S. Cl.
CPC ...... *G06F 16/7867* (2019.01); *G06F 16/9535* (2019.01); *G06K 9/00744* (2013.01); *G06K 9/00973* (2013.01); *G06K 9/00993* (2013.01); *G06K 9/6217* (2013.01); *G06K 9/6288* (2013.01); *G06N 3/02* (2013.01); *G06Q 30/0255* (2013.01); *G06Q 30/0256* (2013.01); *G06Q 30/0269* (2013.01); *H04N 21/251* (2013.01); *H04N 21/44222* (2013.01); *H04N 21/466* (2013.01); *H04N 21/4662* (2013.01); *H04N 21/4666* (2013.01); *H04N 21/4667* (2013.01); *H04N 21/4668* (2013.01)

(58) Field of Classification Search
CPC .... G06K 9/00993; G06K 9/62; G06K 9/6217; G06K 9/6227; G06K 9/6255; G06K 9/6256; G06K 9/6257; G06K 9/6288; G06K 9/629; G06K 9/6292; G06K 9/6293; G06N 3/02; G06N 3/08; G06N 3/084; G06N 20/00; G06N 20/20; G06F 16/435; G06F 16/438; G06F 16/5866; G06F 16/70; G06F 16/735; G06F 16/738; G06F 16/78; G06F 16/783; G06F 16/7867; G06F 16/95; G06F 16/9535; G06F 16/9536; G06F 16/73; G06Q 30/0254; G06Q 30/0255; G06Q 30/0256; G06Q 30/0269; G06Q 30/0271; G06Q 50/01; H04N 21/25; H04N 21/251; H04N 21/44222; H04N 21/466; H04N 21/4661; H04N 21/4662; H04N 21/4665; H04N 21/4666; H04N 21/4667; H04N 21/4668; H04N 21/4755; H04N 21/4756
USPC .... 382/155–160, 224, 227, 228; 700/44, 45, 700/47, 48; 705/7.29, 7.31, 14.49, 14.52, 705/14.53, 14.54, 14.66, 319; 706/15, 16, 706/20, 21, 25; 707/721–723, 728–734, 707/748–751; 725/9, 14, 19, 34, 46
See application file for complete search history.

(56) References Cited

U.S. PATENT DOCUMENTS

| | | | |
|---|---|---|---|
| 8,738,436 B2* | 5/2014 | Tuladhar | G06Q 30/02 705/14.4 |
| 9,552,555 B1 | 1/2017 | Yee et al. | |
| 9,906,704 B2* | 2/2018 | Majumdar | G06K 9/6227 |
| 9,953,086 B2* | 4/2018 | Brodie | G06F 16/9535 |
| 10,354,170 B2* | 7/2019 | Fu | G06K 9/6257 |
| 10,671,679 B2* | 6/2020 | Wang | G06F 16/9535 |
| 10,949,480 B2* | 3/2021 | Chen | G06N 20/00 |
| 2012/0323725 A1 | 12/2012 | Johnston et al. | |
| 2014/0180760 A1* | 6/2014 | Karatzoglou | G06Q 30/0201 705/7.29 |
| 2016/0379132 A1 | 12/2016 | Jin et al. | |
| 2018/0082194 A1 | 3/2018 | Lozanzo et al. | |
| 2018/0114116 A1 | 4/2018 | Liang et al. | |
| 2019/0251446 A1* | 8/2019 | Fang | G06N 3/084 |
| 2020/0110783 A1* | 4/2020 | Ushanov | G06N 20/00 |

FOREIGN PATENT DOCUMENTS

| | | |
|---|---|---|
| CN | 108289057 A | 7/2018 |
| CN | 108537624 A | 9/2018 |
| CN | 108573032 A | 9/2018 |
| CN | 108647226 A | 10/2018 |
| CN | 108648049 A | 10/2018 |
| CN | 109543066 A | 3/2019 |

OTHER PUBLICATIONS

Cui Hongliang, Qin Xiaona, "The video recommendation system based on DBN", 2015 IEEE International Conference on Computer and Information Technology; Ubiquitous Computing and Communications; Dependable, Autonomic and Secure Computing; Pervasive Intelligence and Computing, 2015, pp. 1016-1021 (Year: 2015).*
S. M. Taheri and Iman Irajian, "DeepMovRS: A unified framework for deep learning-based movie recommender systems", 2018 6th Iranian Joint Congress on Fuzzy and Intelligent Systems (CFIS), Apr. 2018, pp. 200-204 (Year: 2018).*
Junyu Gao, Tianzhu Zhang, Changsheng Xu, "A Unified Personalized Video Recommendation via Dynamic Recurrent Neural Networks", Association for Computing Machinery (ACM), Proceedings of the 25th ACM International Conference on Multimedia, Oct. 2017, pp. 127-135 (Year: 2017).*
International Search Report for International Application No. PCT/CN2019/105785 dated Nov. 27, 2019.
Gao, Rui. An Online Video Recommendation System Based on Deep Neural Network, Information & Technology, China Master's Theses Full-Text Database, 2017, No. 07, Jul. 15, 2017.
Written Opinion for International Application No. PCT/CN2019/105785 dated Nov. 27, 2019.

* cited by examiner

METHOD AND DEVICE FOR RECOMMENDING VIDEO, AND COMPUTER READABLE STORAGE MEDIUM

The disclosure is a US National Phase of International Application No. PCT/CN2019/105785, filed Sep. 12, 2019, which is based on and claims the priority under 35 U.S.C. 119 to Chinese Patent Application No. 201811291215.8, filed with the China National Intellectual Property Administration on Oct. 31, 2018 and entitled "VIDEO RECOMMENDATION METHOD AND DEVICE, AND COMPUTER READABLE STORAGE MEDIUM", which is hereby incorporated by reference in its entirety.

FIELD

The disclosure belongs to the field of computer software application, and particularly discloses a method and a device for recommending a video, and a computer readable storage medium.

BACKGROUND

With the development of science and technology and the popularity of the Internet, more and more people use videos to transmit information and share their lives, which makes recommendation for mass personalized video increasingly important. At present, machine learning is widely used to estimate targets such as the click through rate of videos.

The deep learning algorithm used in the video recommendation technology can only estimate one target model at a time, thus reducing the efficiency of estimating targets such as the click through rate of videos.

SUMMARY

The disclosure discloses a method and a device for recommending a video, and a computer readable storage medium.

According to a first aspect of the embodiments of the disclosure, a method for recommending a video is provided, including:

obtaining a user feature of a sample user and a video feature of a sample video;

obtaining a trained user feature and a trained video feature, by learning a click through rate, a like through rate and a follow through rate based on a full-connection neural network algorithm;

jointly learning, based on the trained user feature and the trained video feature, the click through rate, the like through rate and the follow through rate in a neural network on a user side and in a neural network on a video side, respectively; and obtaining a video recommendation list based on a network parameter of a neural network algorithm obtained by the jointly learning.

According to a second aspect of the embodiments of the disclosure, a device for recommending a video is provided, including:

a feature extracting unit, configured to obtain a user feature of a sample user and a video feature of a sample video;

a feature training unit, configured to obtain a trained user feature and a trained video feature by learning a click through rate, a like through rate and a follow through rate based on a full-connection neural network algorithm;

a joint learning unit, configured to jointly learn based on the trained user feature and the trained video feature, the click through rate, the like through rate, and the follow through rate in a neural network on a user side and in a neural network on a video side, respectively; and an online video recommendation unit, configured to obtain a video recommendation list based on a network parameter of a neural network algorithm obtained by the jointly learning.

According to a third aspect of the embodiments of the disclosure, an electronic device is provided, including:

a processor; and a memory for storing instructions which is executable by the processor:

wherein the processor is configured to:

obtain a trained user feature and a trained video feature by learning a click through rate, a like through rate and a follow through rate based on a full-connection neural network algorithm;

jointly learn, based on the trained user feature and the trained video feature, the click through rate, the like through rate, and the follow through rate in a neural network on a user side and in a neural network on a video side, respectively; and obtain a video recommendation list based on a network parameter of a neural network algorithm obtained by the jointly learning.

According to a fourth aspect of embodiments of the disclosure, a computer readable storage medium is provided, computer instructions are stored in the computer readable storage medium, and when the computer instructions are executed, the above method for recommending the video is implemented.

It should be understood that the above general description and the following detailed description are only exemplary and explanatory, and do not limit the disclosure.

DETAILED DESCRIPTION OF THE EMBODIMENTS

Exemplary embodiments will be described in detail herein, examples of which are shown in the accompanying drawings. When the following description refers to the drawings, unless otherwise indicated, the same numbers in different drawings indicate the same or similar elements. The implementation models described in the following exemplary embodiments do not represent all implementation models consistent with the disclosure. On the contrary, they are merely examples of devices and methods consistent with some aspects of the disclosure as detailed in the appended claims.

Figure 1:
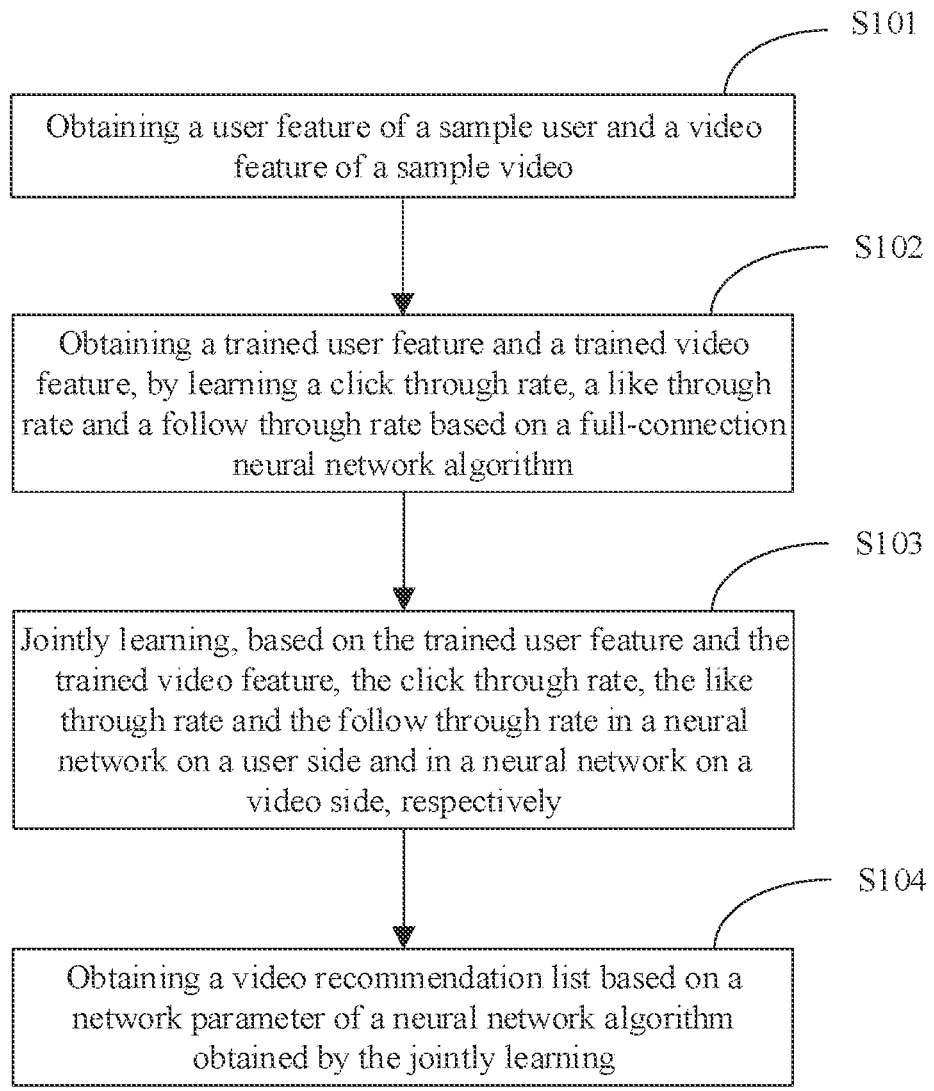
FIG. 1 is a flowchart of a method for recommending a video according to the embodiments.

FIG. 1 is a flowchart of a method for recommending a video according to some embodiments, further including the following steps.

Step S101, obtaining a user feature of a sample user and a video feature of a sample video.

Step S102, obtaining a trained user feature and a trained video feature, by learning a click through rate, a like through rate and a follow through rate based on a full-connection neural network algorithm.

Step S103, jointly learning, based on the trained user feature and the trained video feature, the click through rate, the like through rate and the follow through rate in a neural network on a user side and in a neural network on a video side, respectively.

Step S104, obtaining a video recommendation list based on a network parameter of a neural network algorithm obtained by the jointly learning.

In some embodiments of the disclosure, user features of sample users and video features of sample videos are obtained firstly. Then, the click through rate, the like through rate, and the follow through rate are learned based on the full-connection neural network algorithm to obtain trained user features and video features. After that, according to the trained user features and video features, the click through rate, the like through rate, and the follow through rate in the neural network on the user side and in the neural network on the video side are jointly learned, respectively. Finally, the video recommendation list is obtained according to the network parameter of the neural network algorithm obtained by means of the jointly learning.

According to the embodiments of the disclosure, by adding the training phase based on the full-connection neural network algorithm, the trained user features and video features are obtained, such that cross learning can be fully implemented between the user features and the video features, thereby improving the video recommendation accuracy.

Figure 2:
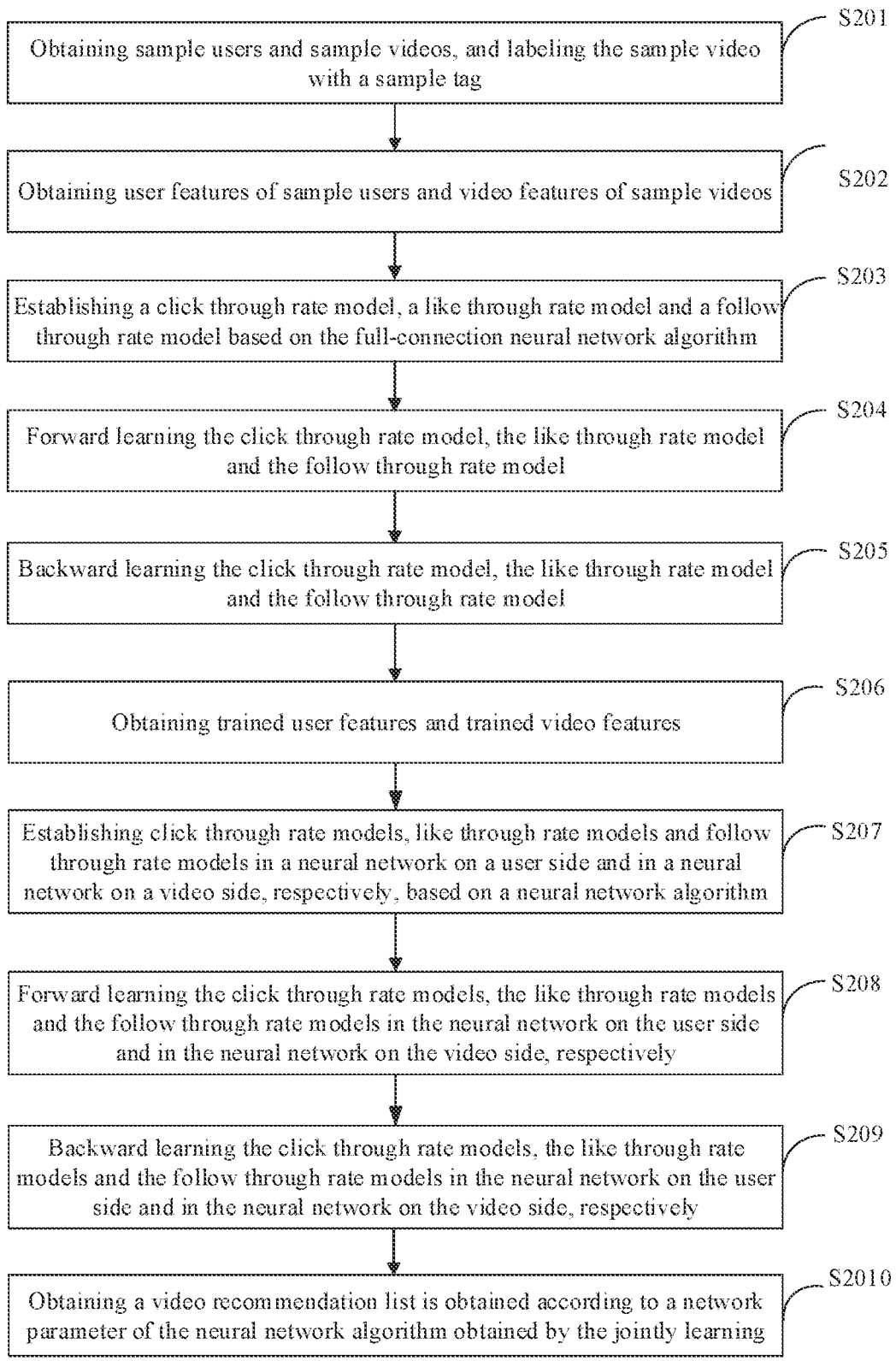
FIG. 2 is a flowchart of a method for recommending a video according to the embodiments.

FIG. 2 is a flowchart of a method for recommending a video according to some embodiments, further including the following steps.

Step S201, obtaining sample users and sample videos, and labeling the sample video with a sample tag.

Step S202, obtaining user features of sample users and video features of sample videos.

Step S203, establishing a click through rate model, a like through rate model and a follow through rate model based on the full-connection neural network algorithm.

Step S204, forward learning the click through rate model, the like through rate model and the follow through rate model.

Step S205, backward learning the click through rate model, the like through rate model and the follow through rate model.

Step S206, obtaining trained user features and trained video features.

Step S207, establishing click through rate models, like through rate models and follow through rate models in a neural network on a user side and in a neural network on a video side, respectively, based on a neural network algorithm.

Step S208, forward learning the click through rate models, the like through rate models and the follow through rate models in the neural network on the user side and in the neural network on the video side, respectively.

Step S209, backward learning the click through rate models, the like through rate models and the follow through rate models in the neural network on the user side and in the neural network on the video side, respectively.

Step S2010, obtaining a video recommendation list is obtained according to a network parameter of the neural network algorithm obtained by the jointly learning.

In the embodiments of the disclosure, the sample users and the sample videos are obtained first, and the sample videos are labeled with the sample tags. Then user features of the sample users and video features of the sample videos are obtained. Then the click through rate model, the like through rate model and the follow through rate model are established based on the full-connection neural network algorithm. Then forward learning is performed on the click through rate model, the like through rate model and the follow through rate model. Then backward learning is performed on the click through rate model, the like through rate model and the follow through rate model. Then trained user features and video features are obtained. Then the click through rate models, the like through rate models and the follow through rate models are established in the neural network on the user side and in the neural network on the video side based on the neural network algorithm. Then forward learning is performed on the click through rate models, the like through rate models and the follow through rate models in the neural network on the user side and in the neural network on the video side, respectively. Then backward learning is performed on the click through rate models, the like through rate models and the follow through rate models in the neural network on the user side and in the neural network on the video side, respectively. Finally, the video recommendation list is obtained according to the network parameter of the neural network algorithm obtained by means of the jointly learning.

According to the embodiments of the disclosure, the above method, based on the learning for the click through rate, the like through rate and the follow through rate based on the full-connection neural network algorithm and the joint learning for the click through rate, the like through rate and the follow through rate in the neural network on the user side and in the neural network on the video side, can simultaneously estimate the click through rate, the like through rate and the follow through rate of the user on the video which greatly improves the efficiency of video recommendation.

In an optional embodiment, each of the user features includes at least one of: an ID feature of a user, a static feature of the user or a dynamic feature of the user. The dynamic feature of the user includes at least one of: a click history feature of the user, a like history feature of the user or a follow list feature of the user. Each of the video features includes at least one of: an ID feature of a video, an ID feature of a creator of the video, a tag feature of the video or a statistical feature of the video.

In an optional embodiment, in the click through rate model, if the sample user clicks on a sample video displayed on an operation page, the sample video is labeled as a positive sample; and if the sample user does not click on the sample video displayed on the operation page, the sample video is labeled as a negative sample. In some embodiments, the sample tag of the positive sample is labeled as 1, and the sample tag of the negative sample is labeled as 0.

In the like through rate model, if the sample user clicks on and likes the sample video, the sample video is labeled as a positive sample; and if the sample user clicks on but does not like the sample video, the sample video is labeled as a negative sample. In some embodiments, the sample tag of the positive sample is labeled as 1, and the sample tag of the negative sample is labeled as 0.

In the follow through rate model, if the sample user clicks on the sample video and follows the creator of the sample video, the sample video is labeled as a positive sample; and if the sample user clicks on the sample video but does not follow the creator of the sample video, the sample video is labeled as a negative sample. In some embodiments, the sample tag of the positive sample is labeled as 1, and the sample tag of the negative sample is labeled as 0.

In an optional embodiment, the step of obtaining the video recommendation list according to the network parameter of the neural network algorithm obtained by the jointly learning includes: receiving a video acquisition request of a target user, obtaining a video feature and a user feature of the target user: calculating a top-level vector of a click through rate, a top-level vector of a like through rate and a top-level vector of a follow through rate on the user side according to the neural network on the user side: calculating a top-level vector of a click through rate, a top-level vector of a like through rate and a top-level vector of a follow through rate on a video side according to the neural network on the video side: calculating an inner product distance between the top-level vector of the click through rate on the user side and the top-level vector of the click through rate on the video side, an inner product distance between the top-level vector of the like through rate on the user side and the top-level vector of the like through rate on the video side, and an inner product distance between the top-level vector of the follow through rate on the user side and the top-level vector of the follow through rate on the video side; and obtaining the recommendation list of target videos by ranking target videos according to the inner product distance of the click through rate, the inner product distance of the like through rate and the inner product distance of the follow through rate. The smaller the inner product distance of the click through rate, the inner product distance of the like through rate and the inner product distance of the follow through rate, the greater the probability that the target user clicks on, likes and follows the target video. During online video recommendation, the videos are ranked according to a ranking formula.

In an optional embodiment, the neural network on the video side periodically calculates the top-level vector of the click through rate, the top-level vector of the like through rate and the top-level vector of the follow through rate of the video side. After receiving the video acquisition request of the target user, the user feature of the target user is obtained, and the top-level vector of the click through rate, the top-level vector of the like through rate and the top-level vector of the follow through rate on the user side are calculated according to the neural network on the user side. The inner product distance between the top-level vector of the click through rate on the user side and the periodically calculated top-level vector of the click through rate on the video side, the inner product distance between the top-level vector of the like through rate on the user side and the periodically calculated top-level vector of the like through rate on the video side, and the inner product distance between the top-level vector of the follow through rate on the user side and the periodically calculated top-level vector of the follow through rate on the video side are calculated; and the target videos are ranked according to the inner product distance of the click through rate, the inner product distance of the like through rate and the inner product distance of the follow through rate to obtain the recommendation list of the videos.

According to the embodiments of the disclosure, the neural network on the video side periodically calculates the top-level vector of the click through rate, the top-level vector of the like through rate and the top-level vector of the follow through rate on the video side. When recommending the video online, the top-level vector of the click through rate, the top-level vector on the like through rate and the top-level vector of the follow through rate on the video side do not depend on the target user, and can be calculated in advance, thus saving algorithm calculation time and improving the efficiency of video recommendation.

Figure 3:
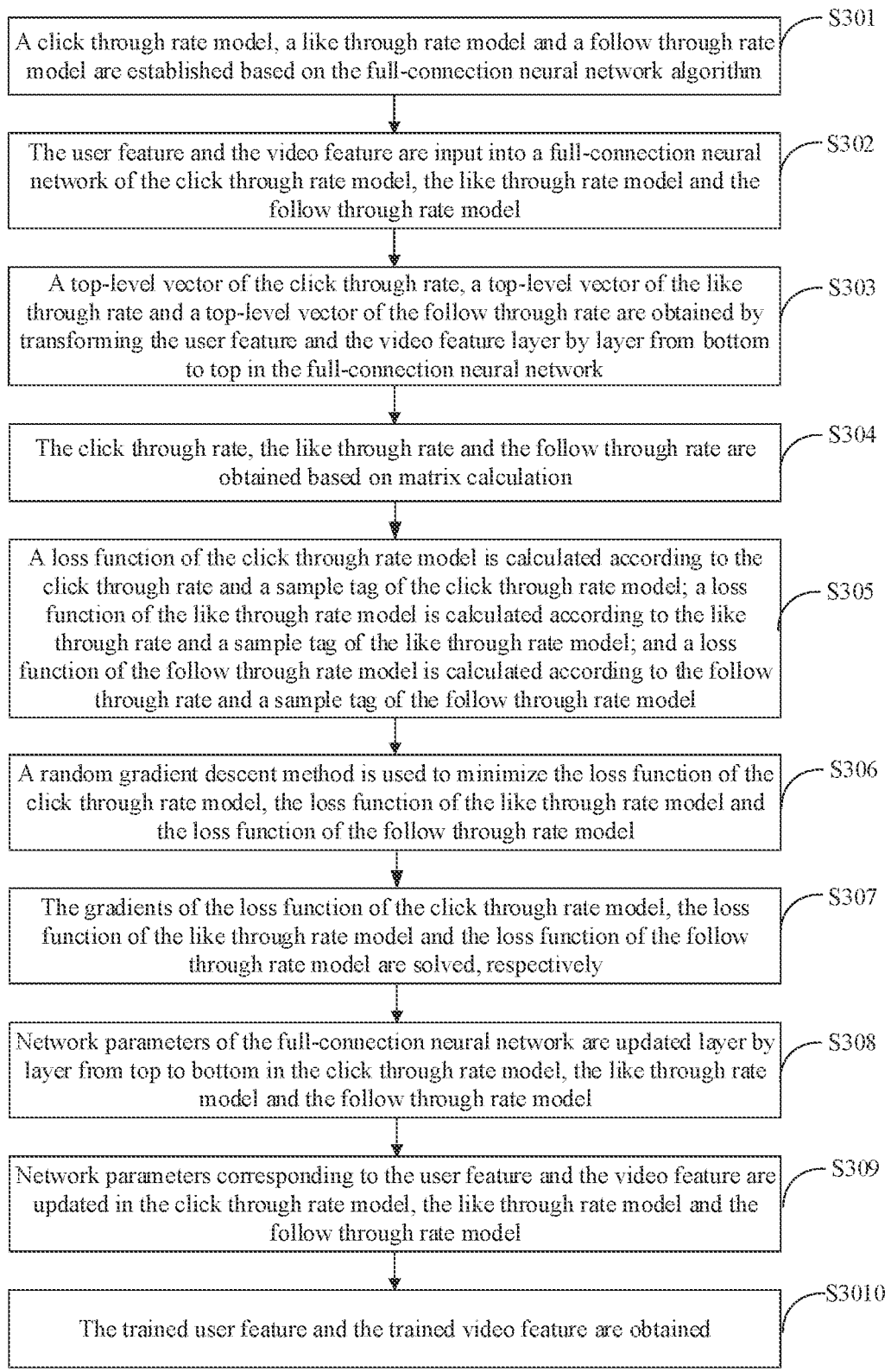
FIG. 3 is a flowchart of a method for recommending a video according to the embodiments.

FIG. 3 is a flowchart of a method for recommending a video according to some embodiments, particularly is a flowchart of a method for learning the click through rate, the like through rate, and the follow through rate based on the full-connection neural network algorithm to obtain the trained user feature and video feature, which further includes the following steps.

Step S301, a click through rate model, a like through rate model and a follow through rate model are established based on the full-connection neural network algorithm.

Step S302, the user feature and the video feature are input into a full-connection neural network of the click through rate model, the like through rate model and the follow through rate model.

Step S303, a top-level vector of the click through rate, a top-level vector of the like through rate and a top-level vector of the follow through rate are obtained by transforming the user feature and the video feature layer by layer from bottom to top in the full-connection neural network.

Step S304, the click through rate, the like through rate and the follow through rate are obtained based on matrix calculation.

Step S305, a loss function of the click through rate model is calculated according to the click through rate and a sample tag of the click through rate model; a loss function of the like through rate model is calculated according to the like through rate and a sample tag of the like through rate model; and a loss function of the follow through rate model is calculated according to the follow through rate and a sample tag of the follow through rate model.

Step S306, a random gradient descent method is used to minimize the loss function of the click through rate model, the loss function of the like through rate model and the loss function of the follow through rate model.

Step S307, the gradients of the loss function of the click through rate model, the loss function of the like through rate model and the loss function of the follow through rate model are solved, respectively.

Step S308, network parameters of the full-connection neural network are updated layer by layer from top to bottom in the click through rate model, the like through rate model and the follow through rate model.

Step S309, network parameters corresponding to the user feature and the video feature are updated in the click through rate model, the like through rate model and the follow through rate model.

Step S3010, the trained user feature and the trained video feature are obtained.

In some embodiments of the disclosure, the click through rate model, the like through rate model and the follow through rate model are established based on the full-connection neural network algorithm. Then the user feature and the video feature are input into a full-connection neural network of the click through rate model, the like through rate model and the follow through rate model. Then the user feature and the video feature are transformed layer by layer from bottom to top in the full-connection neural network to obtain the top-level vector of the click through rate, the top-level vector of the like through rate and the top-level vector of the follow through rate. Then the click through rate, the like through rate and the follow through rate are obtained based on matrix calculation. Then the loss function of the click through rate model is calculated according to the click through rate and the sample tag of the click through rate model; the loss function of the like through rate model is calculated according to the like through rate and the sample tag of the like through rate model; and the loss function of the follow through rate model is calculated according to the follow through rate and the sample tag of the follow through rate model. Then the random gradient descent method is used to minimize the loss function of the click through rate model, the loss function of the like through rate model and the loss function of the follow through rate model. Then the gradients of the loss function of the click through rate model, the loss function of the like through rate model and the loss function of the follow through rate model are solved. Then network parameters of the full-connection neural network are updated layer by layer from top to bottom in the click through rate model, the like through rate model and the follow through rate model. Then network parameters corresponding to the user feature and the video feature are updated in the click through rate model, the like through rate model and the follow through rate model. Finally the trained user feature and video feature are obtained.

According to the embodiments of the disclosure, for video recommendation scenarios, an appropriate loss function is designed to update the network parameters of the full-connection neural network algorithm of the click through rate model, the like through rate model and the follow through rate model layer by layer, thereby further improving the accuracy of video recommendation.

Figure 4:
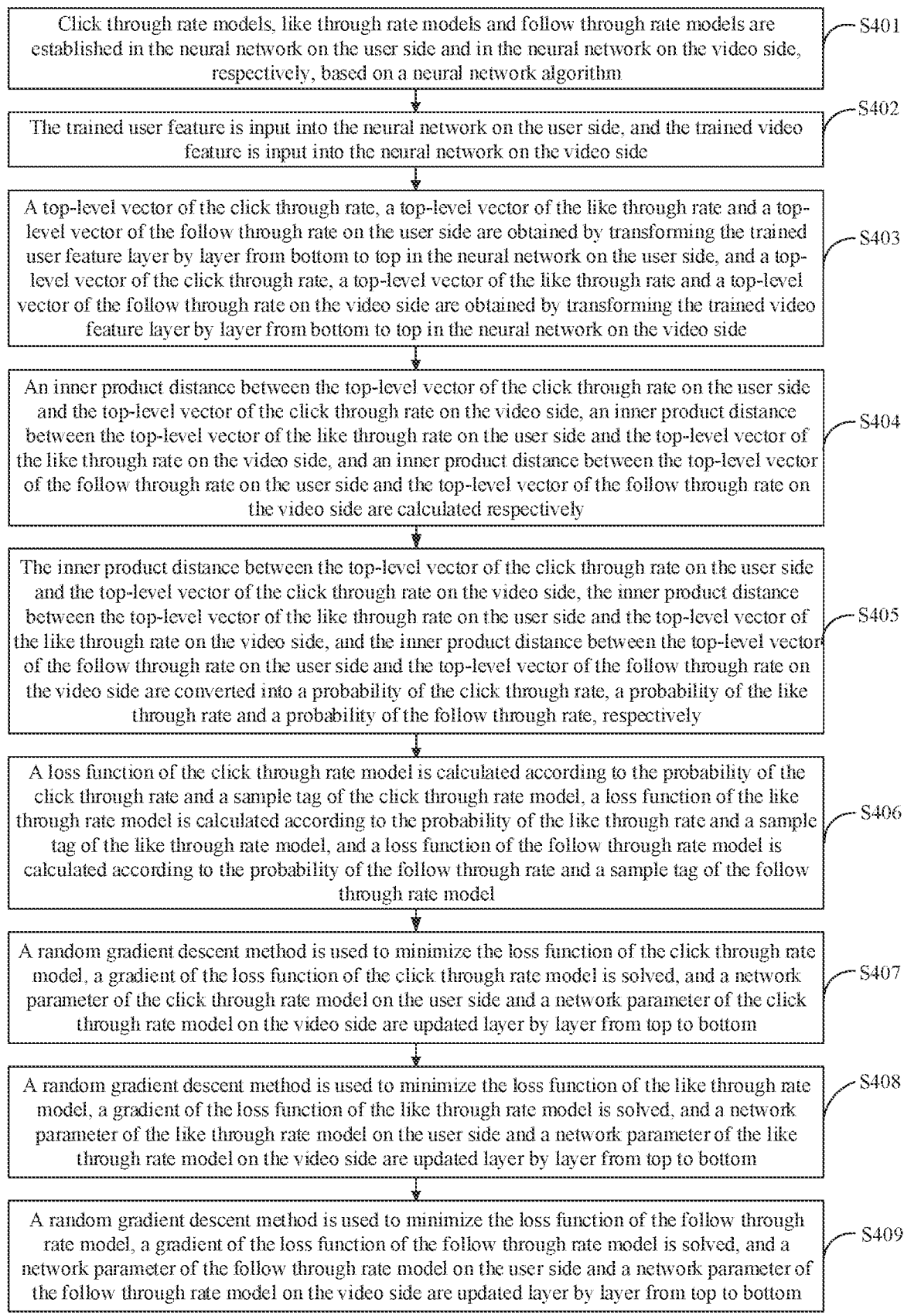
FIG. 4 is a flowchart of a method for recommending a video according to the embodiments.

FIG. 4 is a flowchart of a method for recommending a video according to some embodiments, particularly is a flowchart of a method for jointly learning, according to the trained user feature and video feature, the click through rate, the like through rate, and the follow through rate in the neural network on the user side and in the neural network on the video side, respectively, which further includes the following steps.

Step S401, click through rate models, like through rate models and follow through rate models are established in the neural network on the user side and in the neural network on the video side, respectively, based on a neural network algorithm.

Step S402, the trained user feature is input into the neural network on the user side, and the trained video feature is input into the neural network on the video side.

Step S403, a top-level vector of the click through rate, a top-level vector of the like through rate and a top-level vector of the follow through rate on the user side are obtained by transforming the trained user feature layer by layer from bottom to top in the neural network on the user side, and a top-level vector of the click through rate, a top-level vector of the like through rate and a top-level vector of the follow through rate on the video side are obtained by transforming the trained video feature layer by layer from bottom to top in the neural network on the video side.

Step S404, an inner product distance between the top-level vector of the click through rate on the user side and the top-level vector of the click through rate on the video side, an inner product distance between the top-level vector of the like through rate on the user side and the top-level vector of the like through rate on the video side, and an inner product distance between the top-level vector of the follow through rate on the user side and the top-level vector of the follow through rate on the video side are calculated respectively.

Step S405, the inner product distance between the top-level vector of the click through rate on the user side and the top-level vector of the click through rate on the video side, the inner product distance between the top-level vector of the like through rate on the user side and the top-level vector of the like through rate on the video side, and the inner product distance between the top-level vector of the follow through rate on the user side and the top-level vector of the follow through rate on the video side are converted into a probability of the click through rate, a probability of the like through rate and a probability of the follow through rate, respectively.

Step S406, a loss function of the click through rate model is calculated according to the probability of the click through rate and a sample tag of the click through rate model, a loss function of the like through rate model is calculated according to the probability of the like through rate and a sample tag of the like through rate model, and a loss function of the follow through rate model is calculated according to the probability of the follow through rate and a sample tag of the follow through rate model.

Step S407, a random gradient descent method is used to minimize the loss function of the click through rate model, a gradient of the loss function of the click through rate model is solved, and a network parameter of the click through rate model on the user side and a network parameter of the click through rate model on the video side are updated layer by layer from top to bottom.

Step S408, a random gradient descent method is used to minimize the loss function of the like through rate model, a gradient of the loss function of the like through rate model is solved, and a network parameter of the like through rate model on the user side and a network parameter of the like through rate model on the video side are updated layer by layer from top to bottom.

Step S409, a random gradient descent method is used to minimize the loss function of the follow through rate model, a gradient of the loss function of the follow through rate model is solved, and a network parameter of the follow through rate model on the user side and a network parameter of the follow through rate model on the video side are updated layer by layer from top to bottom.

In some embodiments of the disclosure, click through rate models, like through rate models and follow through rate models are established in the neural network on the user side and in the neural network on the video side, respectively based on a neural network algorithm first. Then the trained user feature is input into the neural network on the user side, and the trained video feature is input into the neural network on the video side. Then the trained user feature is transformed layer by layer from bottom to top in the neural network on the user side to obtain a top-level vector of the click through rate, a top-level vector of the like through rate and a top-level vector of the follow through rate on the user side, and the trained video feature is transformed layer by layer from bottom to top on the neural network on the video side to obtain a top-level vector of the click through rate, a top-level vector of the like through rate and a top-level vector of the follow through rate on the video side. Then an inner product distance between the top-level vector of the click through rate on the user side and the top-level vector of the click through rate on the video side, an inner product distance between the top-level vector of the like through rate on the user side and the top-level vector of the like through rate on the video side, and an inner product distance between the top-level vector of the follow through rate on the user side and the top-level vector of the follow through rate on the video side are calculated. Then the inner product distance between the top-level vector of the click through rate on the user side and the top-level vector of the click through rate on the video side, the inner product distance between the top-level vector of the like through rate on the user side and the top-level vector of the like through rate on the video side, and the inner product distance between the top-level vector of the follow through rate on the user side and the top-level vector of the follow through rate on the video side are converted into a probability of the click through rate, a probability of the like through rate and a probability of the follow through rate respectively. Then a loss function of the click through rate model is calculated according to the probability of the click through rate and a sample tag of the click through rate model, a loss function of the like through rate model is calculated according to the probability of the like through rate and a sample tag of the like through rate model, and a loss function of the follow through rate model is calculated according to the probability of the follow through rate and a sample tag of the follow through rate model. Then a random gradient descent method is used to minimize the loss function of the click through rate model, a gradient of the loss function of the click through rate model is solved, and a network parameter of the click through rate model on the user side and a network parameter of the click through rate model on the video side are updated layer by layer from top to bottom. Then a random gradient descent method is used to minimize the loss function of the like through rate model, a gradient of the loss function of the like through rate model is solved, and a network parameter of the like through rate model on the user side and a network parameter of the like through rate model on the video side are updated layer by layer from top to bottom. Finally a random gradient descent method is used to minimize the loss function of the follow through rate model, a gradient of the loss function of the follow through rate model is solved, and a network parameter of the follow through rate model on the user side and a network parameter of the follow through rate model on the video side are updated layer by layer from top to bottom.

According to the embodiments of the disclosure, for video recommendation scenarios, suitable inner product distances are designed to represent the click through rate, the like through rate and the follow through rate of the user to the video, suitable loss functions are designed to update the network parameters of the neural network algorithm of the click through rate model, the like through rate model and the follow through rate model layer by layer, thereby further improving the accuracy of video recommendation.

The formula for calculating the inner product distance is:

$$\text{distance}(A, B) = \sum_{i=0}^{i=n} (A_i \cdot B_i) \quad (1)$$

wherein $A, B \in R^d$, $A_i$ is the top-level vector on the user side, and $B_i$ is the top-level vector on the video side.

In an optional embodiment, the top-level vector of the click through rate, the top-level vector of the like through rate and the top-level vector of the follow through rate on the user side are $A_1, A_2$ and $A_3$, respectively; the top-level vector of the click through rate, the top-level vector of the like through rate and the top-level vector of the follow through rate on the video side are $B_1, B_2$ and $B_3$, respectively; and the inner product distance between the top-level vector of the click through rate on the user side and the top-level vector of the click through rate on the video side, the inner product distance between the top-level vector of the like through rate on the user side and the top-level vector of the like through rate on the video side, and the inner product distance between the top-level vector of the follow through rate on the user side and the top-level vector of the follow through rate on the video side are distance($A_1, B_1$), distance($A_2, B_2$) and distance($A_3, B_3$), respectively.

In an optional embodiment, the calculation formula for converting the inner product distance between the top-level vector of the click through rate on the user side and the top-level vector of the click through rate on the video side, the inner product distance between the top-level vector of the like through rate on the user side and the top-level vector of the like through rate on the video side, and the inner product distance between the top-level vector of the follow through rate on the user side and the top-level vector of the follow through rate on the video side into the probability of the click through rate, the probability of the like through rate and the probability of the follow through rate respectively is a sigmoid function:

$$\sigma(a) = \frac{1}{1 + \exp(-a)} \quad (2)$$

wherein a is the inner product distance, $\sigma(a)$ is the probability of the inner product distance a, and the value range is (0,1).

In an optional embodiment, the loss function of the click through rate model is calculated according to the probability of the click through rate and the sample tag of the click through rate model, the loss function of the like through rate model is calculated according to the probability of the like through rate and the sample tag of the like through rate model, and the loss function of the follow through rate model is calculated according to the probability of the follow through rate and the sample tag of the follow through rate model. The formula for calculating the loss function (Log Loss) is as follows:

$$l_t(A_t, B_t) = -y_t \log p_t - (1-y_t)\log(1-p_t) \quad (3)$$

wherein $A_t, B_t \in R^d$, $A_t$ is the top-level vector on the user side, $B_t$ is the top-level vector on the video side, $p_t = \sigma(A_t \cdot B_t)$ is the estimated probability of the click through rate, the probability of the like through rate and the probability of the follow through rate, $\sigma$ is the sigmoid function, and $y_t \in \{0,1\}$ is the sample tag.

Figure 5:
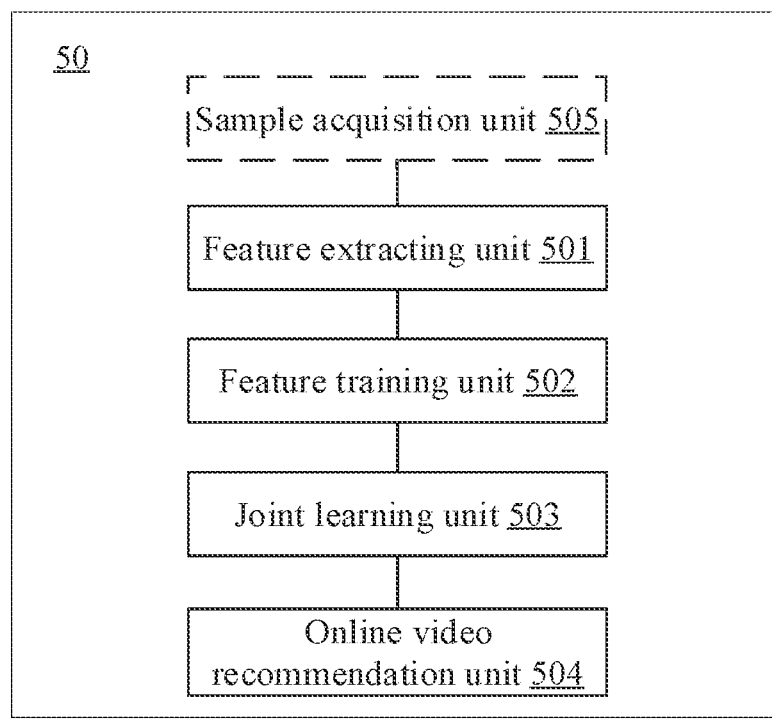
FIG. 5 is a diagram of a device for recommending a video according to the embodiments.

FIG. 5 is a diagram of a device for recommending a video according to some embodiments. As shown in FIG. 5, the device 50 includes a feature extracting unit 501, a feature training unit 502, a joint learning unit 503 and an online video recommendation unit 504.

The feature extracting unit 501 is configured to obtain a user feature of a sample user and a video feature of a sample video.

The feature training unit 502 is configured to obtain a trained user feature and a trained video feature by learning a click through rate, a like through rate and a follow through rate based on a full-connection neural network algorithm.

The joint learning unit 503 is configured to jointly learn, based on the trained user feature and the trained video feature, the click through rate, the like through rate, and the follow through rate in a neural network on a user side and in a neural network on a video side, respectively.

The online video recommendation unit 504 is configured to obtain a video recommendation list based on a network parameter of a neural network algorithm obtained by the jointly learning.

In an optional embodiment, the user feature includes at least one of: an ID feature of the user, a static feature of the user and a dynamic feature of the user.

The video feature includes at least one of: an ID feature of the video, an ID feature of a creator of the video, a tag feature of the video and a statistical feature of the video.

In an optional embodiment, the feature training unit 502 is further configured to:

establish a click through rate model, a like through rate model and a follow through rate model based on the full-connection neural network algorithm;

obtain the click through rate, the like through rate and the follow through rate by forward learning the click through rate model, the like through rate model and the follow through rate model; and obtain the trained user feature and the trained video feature by backward learning the click through rate model, the like through rate model and the follow through rate model.

In an optional embodiment, the joint learning unit 503 is further configured to:

establish click through rate models, like through rate models and follow through rate models in the neural network on the user side and in the neural network on the video side, respectively, based on a neural network algorithm;

forward learn the click through rate models, the like through rate models and the follow through rate models in the neural network on the user side and in the neural network on the video side, respectively; and backward learn the click through rate models, the like through rate models and the follow through rate models in the neural network on the user side and in the neural network on the video side, respectively.

In an optional embodiment, the device 50 further includes: a sample acquisition unit 505, configured to obtain the sample user and the sample video, and label the sample video with a sample tag.

In the click through rate model, if the sample user clicks on the sample video displayed on an operation page, the sample video is labeled as a positive sample; and if the sample user does not click on the sample video displayed on the operation page, the sample video is labeled as a negative sample.

In the like through rate model, if the sample user clicks on and likes the sample video, the sample video is labeled as a positive sample; and if the sample user clicks on but does not like the sample video, the sample video is labeled as a negative sample.

In the follow through rate model, if the sample user clicks on the sample video and follows the creator of the sample video, the sample video is labeled as a positive sample; and if the sample user clicks on the sample video but does not follow the creator of the sample video, the sample video is labeled as a negative sample.

In an optional embodiment, the online video recommendation unit 504 is further configured to:

receive a video acquisition request of a target user:

obtain a video feature and a user feature of the target user:

calculate a top-level vector of a click through rate, a top-level vector of a like through rate and a top-level vector of a follow through rate on the user side based on the neural network on the user side;

calculate a top-level vector of a click through rate, a top-level vector of a like through rate and a top-level vector of a follow through rate on the video side based on the neural network on the video side;

calculate an inner product distance between the top-level vector of the click through rate on the user side and the top-level vector of the click through rate on the video side, an inner product distance between the top-level vector of the like through rate on the user side and the top-level vector of the like through rate on the video side, and an inner product distance between the top-level vector of the follow through rate on the user side and the top-level vector of the follow through rate on the video side; and obtain the recommendation list of target videos by ranking the target videos based on the inner product distance of the click through rate, the inner product distance of the like through rate and the inner product distance of the follow through rate.

In an optional embodiment, the feature extracting unit 501 is further configured to periodically acquire the video feature of the sample video, and the joint learning unit 503 is further configured to periodically calculate the top-level vector of the click through rate, the top-level vector of the like through rate and the top-level vector of the follow through rate on the video side for the neural network on the video side.

Figure 6:
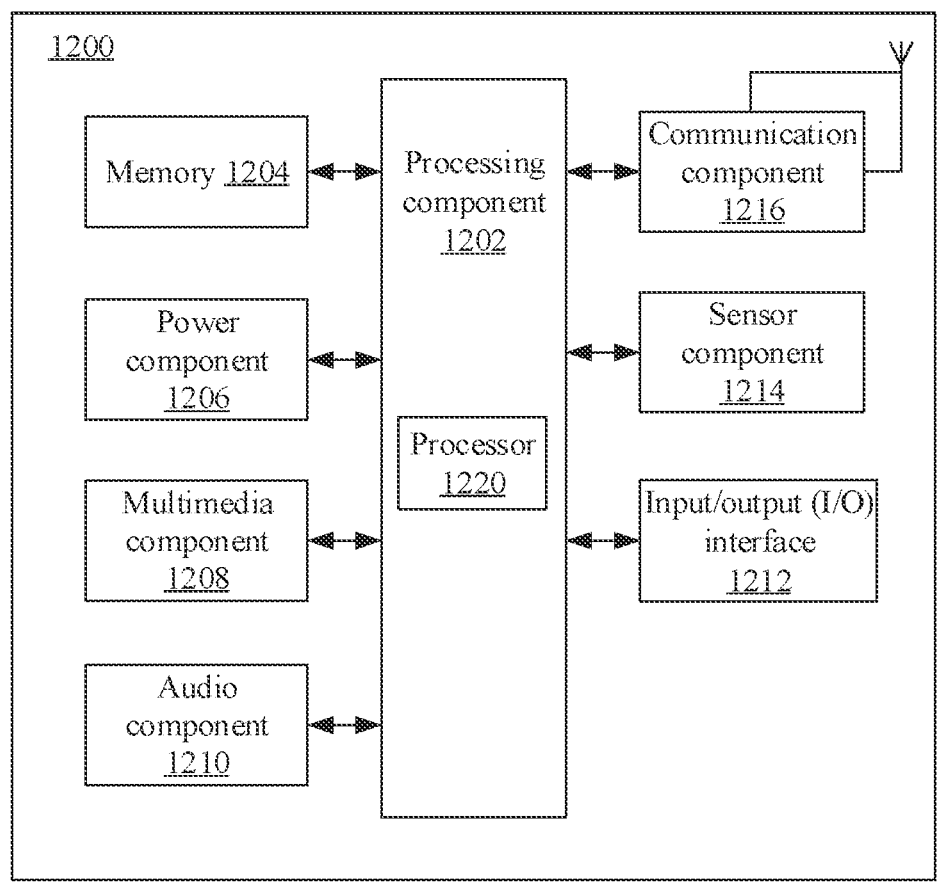
FIG. 6 is a block diagram of an electronic device executing a method for recommending a video according to the embodiments.

FIG. 6 is a block diagram of an electronic device 1200 executing the method for recommending the video according to some embodiments. For example, the electronic device 1200 may be a mobile phone, a computer, a digital broadcasting terminal, a messaging device, a game console, a tablet device, a medical device, fitness equipment, a personal digital assistant, and the like.

Referring to FIG. 6, the electronic device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 generally controls the overall operation of the electronic device 1200, such as operations associated with display, telephone calls, data communication, camera operations, and recording operations. The processing component 1202 may include one or more processors 1220 to execute instructions, so as to complete all or part of the steps of the method described above. In addition, the processing component 1202 may include one or more modules to facilitate interaction between the processing component 1202 and other components. For example, the processing component 1202 may include a multimedia module to facilitate interaction between the multimedia component 1208 and the processing component 1202.

The memory 1204 is configured to store various types of data to support operations at the electronic device 1200. Examples of such data include instructions for any application or method running on the electronic device 1200, contact data, phone book data, messages, pictures, videos, etc. The memory 1204 may be implemented by any type of volatile or nonvolatile storage device or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic disk or optical disk.

The power component 1206 provides power for various components of the electronic device 1200. The power component 1206 may include a power management system, one or more power supplies, and other components associated with generating, managing, and distributing power for the electronic device 1200.

The multimedia component 1208 includes a screen which provides an output interface between the electronic device 1200 and a user. In some embodiments, the screen may include a Liquid Crystal Display (LCD) and a Touch Panel (TP). If the screen includes a touch panel, the screen may be implemented as a touch screen so as to receive an input signal from the user. The touch panel includes one or more touch sensors to sense touch, sliding, and gestures on the touch panel. The touch sensor may not only sense the boundary of the touch or sliding, but also detect the duration and pressure related to the touch or sliding. In some embodiments, the multimedia component 1208 includes a front camera and/or a rear camera. When the electronic device 1200 is in an operation mode, such as a shooting mode or a video mode, the front camera and/or the rear camera may receive external multimedia data. The front camera and rear camera each can be a fixed optical lens system or have a focal length and optical zoom capability.

The audio component 1210 is configured to output and/or input audio signals. For example, the audio component 1210 includes a microphone (MIC) configured to receive external audio signals when the electronic device 1200 is in an operating mode, such as a call mode, a recording mode, and a voice recognition mode. The received audio signals may be further stored in the memory 1204 or transmitted via the communication component 1216. In some embodiments, the audio component 1210 further includes a speaker for outputting the audio signals.

The I/O interface 1212 provides an interface between the processing component 1202 and peripheral interface modules, which may be keyboards, click wheels, buttons, etc. These buttons may include, but are not limited to, a home button, a volume button, a start button, and a lock button.

The sensor component 1214 includes one or more sensors configured to provide state evaluation for the electronic device 1200 from various aspects. For example, the sensor component 1214 may detect the open/closed state of the electronic device 1200, and the relative positioning of the components, such as a display and keypad of the electronic device 1200; and the sensor component 1214 may also detect the position change of the electronic device 1200 or a component of the electronic device 1200, the presence or absence of user contact with the electronic device 1200, the orientation or acceleration/deceleration of the electronic device 1200, and the temperature change of the electronic device 1200. The sensor component 1214 may include a proximity sensor configured to detect the presence of nearby objects without any physical contact. The sensor component 1214 may also include light sensors, such as CMOS or CCD image sensors, for use in imaging applications. In some embodiments, the sensor component 1214 may also include an acceleration sensor, a gyroscope sensor, a magnetic sensor, a pressure sensor, or a temperature sensor.

The communication component 1216 is configured to facilitate wired or wireless communication between the electronic device 1200 and other equipment. The electronic device 1200 may access a wireless network based on a communication standard, such as WiFi, a carrier network (e.g., 2G, 3G, 4G or 5G), or a combination thereof. In an some embodiments, the communication component 1216 receives a broadcast signal or broadcast related information from an external broadcast management system via a broadcast channel. In some embodiments, the communication component 1216 further includes a Near Field Communication (NFC) module to facilitate short-range communication. For example, the NFC module can be implemented based on the Radio Frequency Identification (RFID) technology, the Infrared Data Association (IrDA) technology, the Ultra-Wideband (UWB) technology, the Bluetooth (BT) technology and other technologies.

In some embodiments, the electronic device 1200 may be implemented by one or more Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic elements for performing the above-described methods.

In some embodiments, a non-transitory computer readable storage medium including instructions is provided, such as a memory 1204 including instructions, which can be executed by the processors 1220 of the electronic device 1200 to complete the above method. For example, the non-transitory computer readable storage medium may be a ROM, a Random Access Memory (RAM), a CD-ROM, a magnetic tape, a floppy disk, an optical data storage device, etc.

Figure 7:
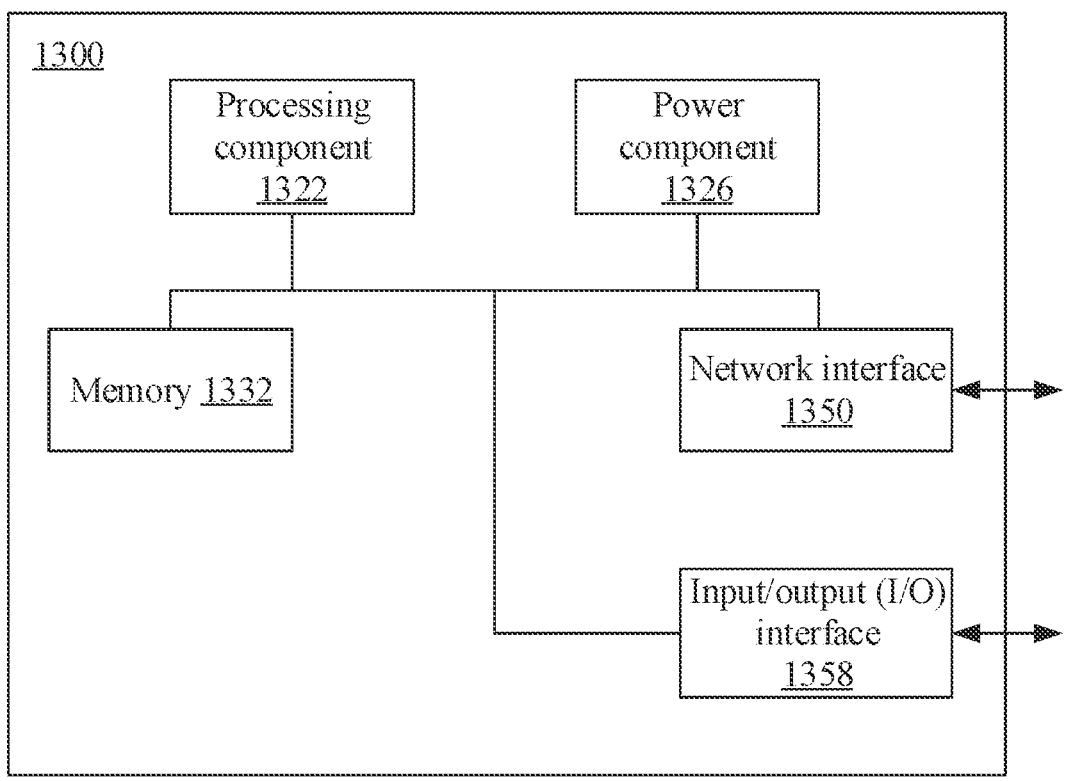
FIG. 7 is a block diagram of an electronic device executing a method for recommending a video according to the embodiments.

FIG. 7 is a block diagram of an electronic device 1300 executing the method for recommending the video according to some embodiments. For example, the electronic device 1300 may be provided as a server. Referring to FIG. 7, the electronic device 1300 includes a processing component 1322, which further includes one or more processors, and memory resources represented by a memory 1332 for storing instructions, such as application programs, that can be executed by the processing component 1322. The application programs stored in the memory 1332 may include one or more modules, each of which corresponds to a set of instructions. In addition, the processing component 1322 is configured to execute instructions to perform the above method.

The electronic device 1300 may further include a power component 1326 configured to perform power management of the electronic device 1300, a wired or wireless network interface 1350 configured to connect the electronic device 1300 to a network, and an input/output (I/O) interface 1358. The electronic device 1300 may operate based on an operating system stored in the memory 1332, such as Windows Server™, Mac OS X™, Unix™, Linux™, FreeBSD™ or the like.

Other embodiments of the disclosure will readily occur to those skilled in the art upon consideration of the specification and practice of the disclosure disclosed herein. The disclosure is intended to cover any variation, use or adaptation of the disclosure, which follows the general principles of the disclosure and includes common knowledge or conventional technical means in the technical field not disclosed in the disclosure. The specification and embodiments are to be considered as exemplary only, with the true scope and spirit of the disclosure being indicated by the following claims.

It should be understood that the disclosure is not limited to the precise structure already described above and shown in the drawings, and various modifications and changes may be made without departing from the scope thereof. The scope of the disclosure is limited only by the appended claims.

What is claimed is:

1. A method for recommending a video, comprising:
obtaining a user feature of a sample user and a video feature of a sample video;
obtaining a trained user feature and a trained video feature, by learning a click through rate, a like through rate and a follow through rate based on a full-connection neural network algorithm;
jointly learning, based on the trained user feature and the trained video feature, the click through rate, the like through rate and the follow through rate in a neural network on a user side and in a neural network on a video side, respectively; and
obtaining a video recommendation list based on a network parameter of a neural network algorithm obtained by the jointly learning.

2. The method for recommending the video according to claim 1, wherein:
the user feature comprises at least one of: an ID feature of a user, a static feature of the user or a dynamic feature of the user; and
the video feature comprises at least one of: an ID feature of a video, an ID feature of a creator of the video, a tag feature of the video or a statistical feature of the video.

3. The method for recommending the video according to claim 2, wherein said obtaining the trained user feature and the trained video feature, by learning the click through rate, the like through rate and the follow through rate based on the full-connection neural network algorithm comprises:
establishing a click through rate model, a like through rate model and a follow through rate model based on the full-connection neural network algorithm;
obtaining the click through rate, the like through rate and the follow through rate by forward learning the click through rate model, the like through rate model and the follow through rate model; and
obtaining the trained user feature and the trained video feature, by backward learning the click through rate model, the like through rate model and the follow through rate model.

4. The method for recommending the video according to claim 3, wherein said jointly learning, based on the trained user feature and the trained video feature, the click through rate, the like through rate and the follow through rate in the neural network on the user side and in the neural network on the video side respectively comprises:
establishing click through rate models, like through rate models and follow through rate models in the neural network on the user side and in the neural network on the video side, respectively, based on a neural network algorithm;
forward learning the click through rate models, the like through rate models and the follow through rate models in the neural network on the user side and in the neural network on the video side, respectively; and
backward learning the click through rate models, the like through rate models and the follow through rate models in the neural network on the user side and in the neural network on the video side, respectively.

5. The method for recommending the video according to claim 4, further comprising:
before obtaining the sample user and the sample video:
obtaining the sample user and the sample video; and
labeling the sample video with a sample tag;
wherein:
if the sample user clicks on the sample video displayed on an operation page, the sample video is labeled as a positive sample; and if the sample user does not click on the sample video displayed on the operation page, the sample video is labeled as a negative sample;
if the sample user clicks on and likes the sample video, the sample video is labeled as a positive sample; and if the sample user clicks on but does not like the sample video, the sample video is labeled as a negative sample; and
if the sample user clicks on the sample video and follows the creator of the sample video, the sample video is labeled as a positive sample; and if the sample user clicks on the sample video but does not follow the creator of the sample video, the sample video is labeled as a negative sample.

6. The method for recommending the video according to claim 5, wherein said obtaining the video recommendation list based on the network parameter of the neural network algorithm comprises:
receiving a video acquisition request of a target user;
obtaining a video feature and a user feature of the target user;
calculating a top-level vector of a click through rate, a top-level vector of a like through rate and a top-level vector of a follow through rate on the user side based on the neural network on the user side;
calculating a top-level vector of a click through rate, a top-level vector of a like through rate and a top-level vector of a follow through rate on the video side based on the neural network on the video side;
calculating an inner product distance between the top-level vector of the click through rate on the user side and the top-level vector of the click through rate on the video side, an inner product distance between the top-level vector of the like through rate on the user side and the top-level vector of the like through rate on the video side, and an inner product distance between the top-level vector of the follow through rate on the user side and the top-level vector of the follow through rate on the video side; and
obtaining a recommendation list of target videos by ranking the target videos based on the inner product distance of the click through rate, the inner product distance of the like through rate and the inner product distance of the follow through rate.

7. An electronic device, comprising:
a processor; and
a memory for storing instructions which is executable by the processor;
wherein the processor is configured to:
obtain a user feature of a sample user and a video feature of a sample video;
obtain a trained user feature and a trained video feature by learning a click through rate, a like through rate and a follow through rate based on a full-connection neural network algorithm;
jointly learn, based on the trained user feature and the trained video feature, the click through rate, the like through rate, and the follow through rate in a neural network on a user side and in a neural network on a video side, respectively; and obtain a video recommendation list based on a network parameter of a neural network algorithm obtained by the jointly learning.

8. The electronic device according to claim 7, wherein:
the user feature comprises at least one of: an ID feature of a user, a static feature of the user or a dynamic feature of the user; and
the video feature comprises at least one of: an ID feature of a video, an ID feature of a creator of the video, a tag feature of the video or a statistical feature of the video.

9. The electronic device according to claim 8, wherein the processor is further configured to:
establish a click through rate model, a like through rate model and a follow through rate model based on the full-connection neural network algorithm;
obtain the click through rate, the like through rate and the follow through rate by forward learning the click through rate model, the like through rate model and the follow through rate model; and
obtain the trained user feature and the trained video feature by backward learning the click through rate model, the like through rate model and the follow through rate model.

10. The electronic device according to claim 9, wherein the processor is further configured to:
establish click through rate models, like through rate models and follow through rate models in the neural network on the user side and in the neural network on the video side, respectively, based on a neural network algorithm;
forward learn the click through rate models, the like through rate models and the follow through rate models in the neural network on the user side and in the neural network on the video side, respectively; and
backward learn the click through rate models, the like through rate models and the follow through rate models in the neural network on the user side and in the neural network on the video side, respectively.

11. The electronic device according to claim 10, wherein the processor is further configured to:
obtain the sample user and the sample video and label the sample video with a sample tag before obtaining the user feature of the sample user and the video feature of the sample video;
wherein:
if the sample user clicks on the sample video displayed on an operation page, the sample video is labeled as a positive sample; and if the sample user does not click on the sample video displayed on the operation page, the sample video is labeled as a negative sample;
if the sample user clicks on and likes the sample video, the sample video is labeled as a positive sample; and if the sample user clicks on but does not like the sample video, the sample video is labeled as a negative sample; and
if the sample user clicks on the sample video and follows the creator of the sample video, the sample video is labeled as a positive sample; and if the sample user clicks on the sample video but does not follow the creator of the sample video, the sample video is labeled as a negative sample.

12. The electronic device according to claim 11, wherein the processor is further configured to:
receive a video acquisition request of a target user;
obtain a video feature and a user feature of the target user;
calculate a top-level vector of a click through rate, a top-level vector of a like through rate and a top-level vector of a follow through rate on the user side based on the neural network on the user side;
calculate a top-level vector of a click through rate, a top-level vector of a like through rate and a top-level vector of a follow through rate on the video side based on the neural network on the video side;
calculate an inner product distance between the top-level vector of the click through rate on the user side and the top-level vector of the click through rate on the video side, an inner product distance between the top-level vector of the like through rate on the user side and the top-level vector of the like through rate on the video side, and an inner product distance between the top-level vector of the follow through rate on the user side and the top-level vector of the follow through rate on the video side; and
obtain a recommendation list of target videos by ranking the target videos based on the inner product distance of the click through rate, the inner product distance of the like through rate and the inner product distance of the follow through rate.

13. A non-transitory computer readable storage medium, wherein the non-transitory computer readable storage medium stores computer instructions which, when executed by at least one processor, cause the at least one processor to:
obtain a user feature of a sample user and a video feature of a sample video;
obtain a trained user feature and a trained video feature by learning a click through rate, a like through rate and a follow through rate based on a full-connection neural network algorithm;
jointly learn, based on the trained user feature and the trained video feature, the click through rate, the like through rate, and the follow through rate in a neural network on a user side and in a neural network on a video side, respectively; and
obtain a video recommendation list based on a network parameter of a neural network algorithm obtained by the jointly learning.

14. The non-transitory computer readable storage medium according to claim 13, wherein:
the user feature comprises at least one of: an ID feature of a user, a static feature of the user or a dynamic feature of the user; and
the video feature comprises at least one of: an ID feature of a video, an ID feature of a creator of the video, a tag feature of the video or a statistical feature of the video.

15. The non-transitory computer readable storage medium according to claim 14, wherein the non-transitory computer readable storage medium stores the computer instructions which, when executed by the at least one processor, cause the at least one processor to:
establish a click through rate model, a like through rate model and a follow through rate model based on the full-connection neural network algorithm;
obtain the click through rate, the like through rate and the follow through rate by forward learning the click through rate model, the like through rate model and the follow through rate model; and
obtain the trained user feature and the trained video feature by backward learning the click through rate model, the like through rate model and the follow through rate model.

16. The non-transitory computer readable storage medium according to claim 15, wherein the non-transitory computer readable storage medium stores the computer instructions which, when executed by the at least one processor, cause the at least one processor to:
- establish click through rate models, like through rate models and follow through rate models in the neural network on the user side and in the neural network on the video side, respectively, based on a neural network algorithm;
- forward learn the click through rate models, the like through rate models and the follow through rate models in the neural network on the user side and in the neural network on the video side, respectively; and
- backward learn the click through rate models, the like through rate models and the follow through rate models in the neural network on the user side and in the neural network on the video side, respectively.

17. The non-transitory computer readable storage medium according to claim 16, wherein the non-transitory computer readable storage medium stores the computer instructions which, when executed by the at least one processor, cause the at least one processor to:
- obtain the sample user and the sample video and label the sample video with a sample tag before obtaining the user feature of the sample user and the video feature of the sample video;

wherein:
- if the sample user clicks on the sample video displayed on an operation page, the sample video is labeled as a positive sample; and if the sample user does not click on the sample video displayed on the operation page, the sample video is labeled as a negative sample;
- if the sample user clicks on and likes the sample video, the sample video is labeled as a positive sample; and if the sample user clicks on but does not like the sample video, the sample video is labeled as a negative sample; and
- if the sample user clicks on the sample video and follows the creator of the sample video, the sample video is labeled as a positive sample; and if the sample user clicks on the sample video but does not follow the creator of the sample video, the sample video is labeled as a negative sample.

18. The non-transitory computer readable storage medium according to claim 17, wherein the non-transitory computer readable storage medium stores the computer instructions which, when executed by the at least one processor, cause the at least one processor to:
- receive a video acquisition request of a target user;
- obtain a video feature and a user feature of the target user;
- calculate a top-level vector of a click through rate, a top-level vector of a like through rate and a top-level vector of a follow through rate on the user side based on the neural network on the user side;
- calculate a top-level vector of a click through rate, a top-level vector of a like through rate and a top-level vector of a follow through rate on the video side based on the neural network on the video side;
- calculate an inner product distance between the top-level vector of the click through rate on the user side and the top-level vector of the click through rate on the video side, an inner product distance between the top-level vector of the like through rate on the user side and the top-level vector of the like through rate on the video side, and an inner product distance between the top-level vector of the follow through rate on the user side and the top-level vector of the follow through rate on the video side; and
- obtain a recommendation list of target videos by ranking the target videos based on the inner product distance of the click through rate, the inner product distance of the like through rate and the inner product distance of the follow through rate.

* * * * *